United States Patent
Shimizu et al.

(10) Patent No.: US 9,131,236 B2
(45) Date of Patent: Sep. 8, 2015

(54) CODE AMOUNT CONTROL METHOD AND APPARATUS

(75) Inventors: Atsushi Shimizu, Yokosuka (JP); Naoki Ono, Yokosuka (JP); Masaki Kitahara, Yokosuka (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 289 days.

(21) Appl. No.: 13/696,272

(22) PCT Filed: Apr. 22, 2011

(86) PCT No.: PCT/JP2011/059953
§ 371 (c)(1),
(2), (4) Date: Nov. 5, 2012

(87) PCT Pub. No.: WO2011/142236
PCT Pub. Date: Nov. 17, 2011

(65) Prior Publication Data
US 2013/0051460 A1    Feb. 28, 2013

(30) Foreign Application Priority Data
May 12, 2010   (JP) ................................. 2010-109879

(51) Int. Cl.
*H04N 7/26*      (2006.01)
*H04N 19/142*    (2014.01)
(Continued)

(52) U.S. Cl.
CPC ........... *H04N 19/142* (2014.11); *H04N 19/115* (2014.11); *H04N 19/14* (2014.11); *H04N 19/159* (2014.11); *H04N 19/172* (2014.11); *H04N 19/61* (2014.11); *H04N 19/124* (2014.11)

(58) Field of Classification Search
CPC .................... H04N 19/0009; H04N 19/00157; H04N 19/00163; H04N 19/00781; H04N 19/00181; H04N 19/00266; H04N 19/00278; H04N 19/00921; H04N 19/00145; H04N 19/00169; H04N 19/00193; H04N 19/002; H04N 19/00218; H04N 19/00272
USPC ........................ 375/240.08, E7.026; 348/700
See application file for complete search history.

(56) References Cited

U.S. PATENT DOCUMENTS 5,978,029 A * 11/1999 Boice et al. ............... 375/240.14
6,587,506 B1   7/2003 Noridomi et al.
(Continued)

FOREIGN PATENT DOCUMENTS

EP    2 150 061 A1    2/2010
JP    2001-028753 A   1/2001
(Continued)

OTHER PUBLICATIONS

International Search Report for PCT/JP2011/059953, ISA/JP, mailed Jul. 12, 2011 with English translation.
(Continued)

*Primary Examiner* — Mohammed Rahaman
(74) *Attorney, Agent, or Firm* — Harness, Dickey & Pierce, P.L.C.

(57) ABSTRACT

A code amount control method used in a video encoding method for performing code amount control by estimating a generated code amount for an encoding target picture. The control method includes steps of computing a feature value of the encoding target picture and stores the value into a storage device; extracting a feature value of a previously-encoded picture stored in the storage device and used for generated code amount estimation; comparing the feature values of the encoding target picture and the previously-encoded picture; and a step performed according to a result of the comparison. If it is determined that difference between both feature values is larger than a predetermined criterion value, the amount of code generated for the encoding target picture is estimated using no result of encoding of the previously-encoded picture, and otherwise the relevant generated code amount is estimated based on a result of the encoding.

10 Claims, 5 Drawing Sheets

(51) Int. Cl.
*H04N 19/159* (2014.01)
*H04N 19/172* (2014.01)
*H04N 19/115* (2014.01)
*H04N 19/61* (2014.01)
*H04N 19/14* (2014.01)
*H04N 19/124* (2014.01)

(56) References Cited

U.S. PATENT DOCUMENTS

| | | | |
|---|---|---|---|
| 7,197,072 B1 | 3/2007 | Hsu et al. | |
| 2001/0055337 A1* | 12/2001 | Matsuzaki et al. | 375/240.12 |
| 2002/0181589 A1* | 12/2002 | Wake et al. | 375/240.14 |
| 2005/0089096 A1* | 4/2005 | Sato et al. | 375/240.12 |
| 2005/0152450 A1* | 7/2005 | Ueno et al. | 375/240.03 |
| 2005/0175093 A1* | 8/2005 | Haskell et al. | 375/240.03 |
| 2006/0093032 A1* | 5/2006 | Shindo | 375/240.03 |
| 2009/0110070 A1 | 4/2009 | Takahashi et al. | |
| 2009/0110081 A1 | 4/2009 | Boice et al. | |
| 2009/0116555 A1 | 5/2009 | Oishi | |
| 2010/0116555 A1 | 5/2010 | Peltola et al. | |

FOREIGN PATENT DOCUMENTS

| | | |
|---|---|---|
| JP | 2004-007498 A | 1/2004 |
| JP | 2004-266640 A | 9/2004 |
| JP | 2006-135557 A | 5/2006 |
| JP | 2007-318617 A | 12/2007 |
| JP | 2009-055262 A | 3/2009 |

OTHER PUBLICATIONS

Written Opinion of the International Preliminary Examining Authority for PCT/JP2011/059953, IPEA/JP, mailed May 1, 2012 with partial English translation.

Office Action, Russian Patent Application No. 2012147241, Feb. 18, 2014.

Search Report, European Patent Application No. 11780493.0, Mar. 3, 2014.

Notice of Allowance, Russian Patent Application No. 2012147241, Sep. 8, 2014.

* cited by examiner

CODE AMOUNT CONTROL METHOD AND APPARATUS

TECHNICAL FIELD

The present invention relates to a video encoding technique, and in particular, to a code amount control method, a code amount control apparatus, and a code amount control program which can prevent degradation in image quality even when characteristics of video are considerably changed.

Priority is claimed on Japanese Patent Application No. 2010-109879, filed May 12, 2010, the contents of which are incorporated herein by reference.

BACKGROUND ART

When encoding an input image using a predetermined bit rate, it is necessary to determine a target amount of code for an encoding target picture and further to determine a quantization width based on a degree of complexity of the encoding target picture. For example, encoding of a (complex) video image including lots of texture parts or a video image including a considerable motion part is relatively difficult and the amount of code generated therefor tends to increase. In contrast, encoding of a video image having less variation in luminance or a video image including no motion part is relatively easy. Accordingly, each video image has an inherit complexity for encoding.

For the complexity of an encoding target picture, most encoding methods estimate it based on a result of encoding such as the amount of code generated for a previously-encoded picture, and then determine the quantization width. That is, with a premise that images having similar characteristics continue, the complexity of the encoding target picture is estimated based on a result of encoding of a previously-encoded picture.

However, in a video image having a considerable variation in video characteristics, usage of a result of encoding of a previously-encoded picture may degrade prediction accuracy, which tends to cause unstable encoding control unstable or inappropriate code amount allocation, thereby degrading the relevant image quality.

Therefore, Patent Document 1 proposes a method for correcting a "complexity index" by using feature values obtained within a previously-encoded picture and an encoding target picture.

That is, when encoding the amount of code generated for the encoding target picture based on a result of the encoding of the previously-encoded picture, the feature value in each of the previously-encoded picture used for the relevant estimation and the encoding target picture is computed, and a complexity index used for the code amount estimation is corrected using the feature values computed within the pictures.

Accordingly, it is possible to stably control the amount of code even for a video image (e.g. fade image) whose complexity gradually varies.

In typical video encoding methods, multiple picture types are defined for different prediction modes such as inter-picture prediction and intra-picture prediction. Since different picture types have different degrees of complexity, an encoding result of the same picture type is used for the complexity estimation.

Patent Document 1 also considers the picture type, and assigns processes to the picture types by switching the operation.

Figure 4:
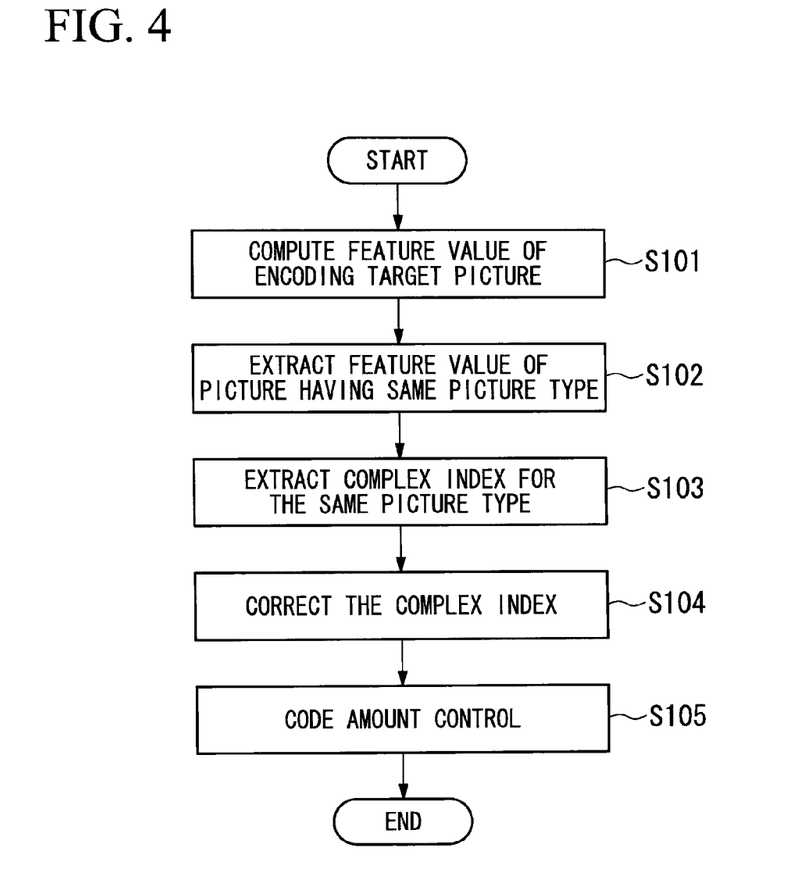
FIG. 4 is a flowchart showing a conventional method of estimating the complex index.

FIG. 4 is a flowchart showing a conventional method of estimating the complex index.

First, a feature value for an encoding target picture is computed (see step S101).

Next, a feature value of any of previously-encoded pictures, which has the same picture type as the encoding target picture is extracted (see step S102).

Additionally, a complex index for the same picture type is extracted (see step S103).

The extracted complex index is corrected using the feature values obtained by steps S101 and S102 (see step S104).

The amount of code generated by encoding of the encoding target picture is controlled using the corrected complex index (see step S105).

PRIOR ART DOCUMENT

Patent Document

Patent Document 1: Japanese Unexamined Patent Application, First Publication No. 2009-55262.

DISCLOSURE OF INVENTION

Problem to be Solved by the Invention

As shown in Patent Document 1, intra pictures (i.e., I pictures) among multiple picture types are not frequently inserted, and thus they are generally positioned at large intervals in most cases. Therefore, correction of the complex index disclosed in Patent Document 1 is meaningful for I pictures.

However, if a video image has a speedy variation, or the intervals of inserted I pictures are large (as explained above), the previously-encoded picture used for the relevant estimation and the encoding target picture belong completely different scenes, as in a scene change case.

In such a case, even belonging to the same picture type, both pictures may have different tendencies for the complex index, and thus the estimation accuracy may not be improved even by referring to the information of the previously-encoded picture. Depending on conditions, the estimation accuracy may be degraded.

Figure 5:
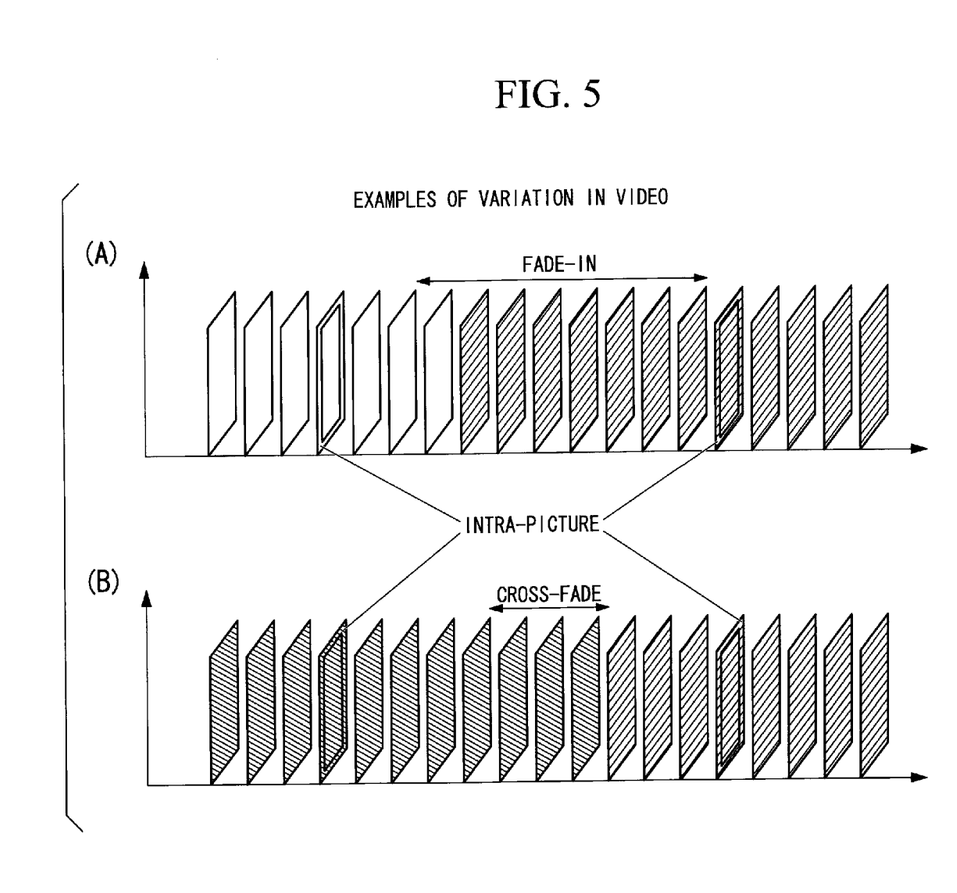
FIG. 5 is a diagram showing examples of variation in video.

FIG. 5 shows examples of variation in video. Pictures surrounded by double lines are I pictures.

In part A of FIG. 5, position of I pictures in a fade-in video image are shown. When the fade-in section is shorter than the interval between the I pictures, the shown two I pictures produce completely different images.

Additionally, part B of FIG. 5 shows a video image in which a cross-fade occurs within a short section. Also in this case, two I pictures belong to different scenes.

As described above, even when the video image gradually changes, the previously-encoded picture used for the estimation and the encoding target picture may belong to completely different scenes due to the distance between the pictures. The relationship between the quantization width and the amount of generated code may be considerably different between such completely different scenes, thereby degrading the accuracy for estimating the complexity.

Such a problem is applicable not only to I pictures, but also to the other picture types.

The present invention has an object to solve the above problem and to prevent degradation in image quality by an appropriate code amount control even when characteristics of the relevant video considerably changes.

Means for Solving the Problem

In order to solve the above problem, the present invention provides a code amount control method used in a video encoding method for performing code amount control by estimating an amount of code generated for an encoding target picture, the control method comprising:

a step that computes a feature value of the encoding target picture and stores the value into a storage device;

a step that extracts a feature value of a previously-encoded picture which is used for generated code amount estimation, where the feature value has been stored in the storage device;

a step that compares the feature value of the encoding target picture with the feature value of the previously-encoded picture; and a step that is performed according to a result of the feature value comparison, wherein if it is determined that difference between both feature values is larger than a predetermined criterion value and the encoding target picture is more complex than the previously-encoded picture, the step estimates the amount of code generated for the encoding target picture by using no result of encoding of the previously-encoded picture, and otherwise the step estimates the amount of code generated for the encoding target picture based on a result of encoding of the previously-encoded picture.

As the feature value of the encoding target picture or the previously-encoded picture, one of a variance, an average, and a coefficient obtained by Fourier transform of a video signal (a luminance signal or a color difference signal) may be used.

In the step that estimates the amount of code generated for the encoding target picture, when determining whether or not the difference between both feature values is larger than the predetermined criterion value, a threshold may be applied to a ratio between both feature values.

In this case, another threshold may also be applied to a size of the feature values.

Preferably, when determining the previously-encoded picture used for the generated code amount estimation, a previously-encoded picture having the same picture type as the encoding target picture is selected.

When estimating the amount of code generated for the encoding target picture by using no result of encoding of the previously-encoded picture, parameters for the code amount control are initialized in advance.

When estimating the amount of code generated for the encoding target picture by using no result of encoding of the previously-encoded picture, the code of generated code is estimated using the feature value of the encoding target picture.

The present invention also provides a code amount control apparatus used for a video encoding method for performing code amount control by estimating an amount of code generated for an encoding target picture, the control apparatus comprising:

a device that computes a feature value of the encoding target picture;

a storage device that stores the computed feature value of the encoding target picture;

a device that extracts a feature value of a previously-encoded picture which is used for generated code amount estimation, where the feature value has been stored in the storage device;

a device that compares the feature value of the encoding target picture with the feature value of the previously-encoded picture; and a device that is performed according to a result of the feature value comparison, wherein if it is determined that difference between both feature values is larger than a predetermined criterion value, and the encoding target picture is more complex than the previously-encoded picture, the device estimates the amount of code generated for the encoding target picture by using no result of encoding of the previously-encoded picture, and otherwise the device estimates the amount of code generated for the encoding target picture based on a result of encoding of the previously-encoded picture.

As described above, in the present invention, difference in video characteristics between the previously-encoded picture used for the generated code amount estimation and the encoding target picture is determined using feature values. If both characteristics considerably differ, no encoding result of the previously-encoded picture is used for the relevant code amount control. Since no usage of such an encoding result is only performed when there is considerable difference between both video characteristics, code amount estimation is not performed based on an unsuitable encoding result, thereby reducing an error for estimation of the generated code amount in the code amount control and performing an appropriate code amount allocation.

Effect of the Invention

In accordance with the present invention, it is possible to control the amount of code of an encoding target picture by using no encoding result of a previously-encoded picture whose characteristics considerably differ from the encoding target picture. Therefore, even when video characteristics of both pictures are considerably different from each other, an appropriate code amount allocation can be performed, thereby preventing degradation in image quality due to the code amount control.

MODE FOR CARRYING OUT THE INVENTION

Prior to explaining embodiments of the present invention, general operation by the present invention will be explained.

As described above, even when a video image gradually changes, a previously-encoded picture used for the relevant estimation and an encoding target picture may belong to completely different scenes due to the distance between the pictures. The relationship between the quantization width and the amount of generated code may be considerably different between such completely different scenes, and thus conventional methods may degrade the accuracy for estimating the complexity.

Therefore, in the present invention, when the relevant pictures have considerably different characteristics, the code amount control is performed using no result of encoding of the previously-encoded picture.

When having such considerably different characteristics, there are one case of increasing the degree of complexity, and another case of decreasing the degree of complexity. The code amount control using no encoding result of the previously-encoded picture may be applied only to the case of increasing the degree of complexity. This is because in the case of decreasing the degree of complexity, no excess amount of code is generated, which may produce no considerable problem.

The degree of variation in characteristics is indicated using a feature value of each picture. The feature value may be a variance, an average, or a coefficient obtained by Fourier transform of a luminance signal or a color difference signal, that is, a value which can be computed before the relevant encoding is started.

In a feature value comparison process, a difference or ratio between two pictures is computed, and the computed value is compared with a threshold. For example, if the result of the comparison exceeds the threshold, parameters relating to the code amount control are initialized.

In addition, the absolute value for the feature value may be considered as a condition. For example, when the ratio for the variance of luminance is subjected to the relevant comparison, although variance 1 is 100 times as much as variance 0.01, both variances are small and it does not always indicate a considerable difference in image characteristics. However, variance 1000 which is the same 100 times as much as variance 10 probably has considerably different characteristics in comparison with variance 10. Therefore, an absolute value for the feature value is also considered as a condition.

In the above example, conditions such that "the variance of luminance of the previously-encoded picture is 10 or more, and produces a ratio of 100 times" may be defined.

The comparison using an absolute value may be applied, not to the previously-encoded picture, or to the encoding target picture. In the above example, conditions such that "the variance of luminance of the encoding target picture is 1000 or more, and produces a ratio of 100 times" may be defined.

When performing the code amount control without using any encoding result of previously-encoded pictures, the amount of generated code may be estimated using the encoding target picture by means of a known method. Additionally, parameters for the code amount control may be initialized.

For example, in a case of determining the amount of code generated for a P picture or B picture based on an encoding result of an immediately-before I picture; a case in which the relevant I pictures have considerably different characteristics; and a case of processing P or B pictures, the code amount control may be performed in an initialized state, without using any encoding result of previously-encoded pictures.

Figure 1:
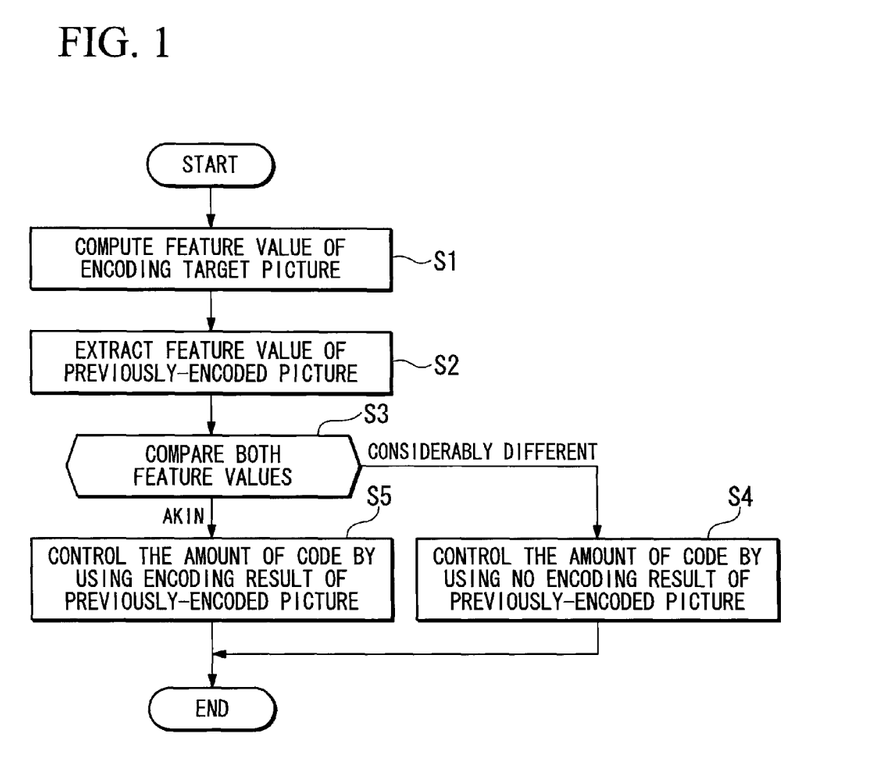
FIG. 1 is a flowchart showing a basic operation according to the present invention.

FIG. 1 is a flowchart showing a basic operation according to the present invention.

First, a feature value for an encoding target picture is computed (see step S1).

Next, a feature value of a previously-encoded picture is extracted, where the feature value was stored during the encoding (see step S2).

The two feature values obtained by the above steps S1 and S2 are compared with each other (see step S3). If it is determined that characteristics of both pictures are considerably different, the code amount control is performed using no encoding result of the relevant previously-encoded picture (see step S4). If it is determined that characteristics of both pictures are akin to each other, the code amount control is performed using an encoding result of the relevant previously-encoded picture (see step S5).

The above computed feature value is stored in a memory so as to use it later.

Below, a specific embodiment of the present invention will be explained. The present embodiment targets I pictures, and uses a variance of a luminance signal as a feature value. In addition, a previously-encoded picture which is a target for the relevant comparison is an I picture which has been encoded immediately before (the current target).

For usage of no encoding result of the previously-encoded picture, the following two conditions are satisfied simultaneously:

(i) the variance of the luminance signal (called the "luminance variance" below) has increased by X times or higher; and
(ii) the luminance variance of the previously-encoded picture is TH or larger, where X is a threshold for the relevant ratio, and TH is a threshold for the luminance variance.

Additionally, if it is determined that characteristics of both pictures are considerably different, then information about the code amount control, not only for the I picture type but also for the other picture types, is initialized.

Figure 2:
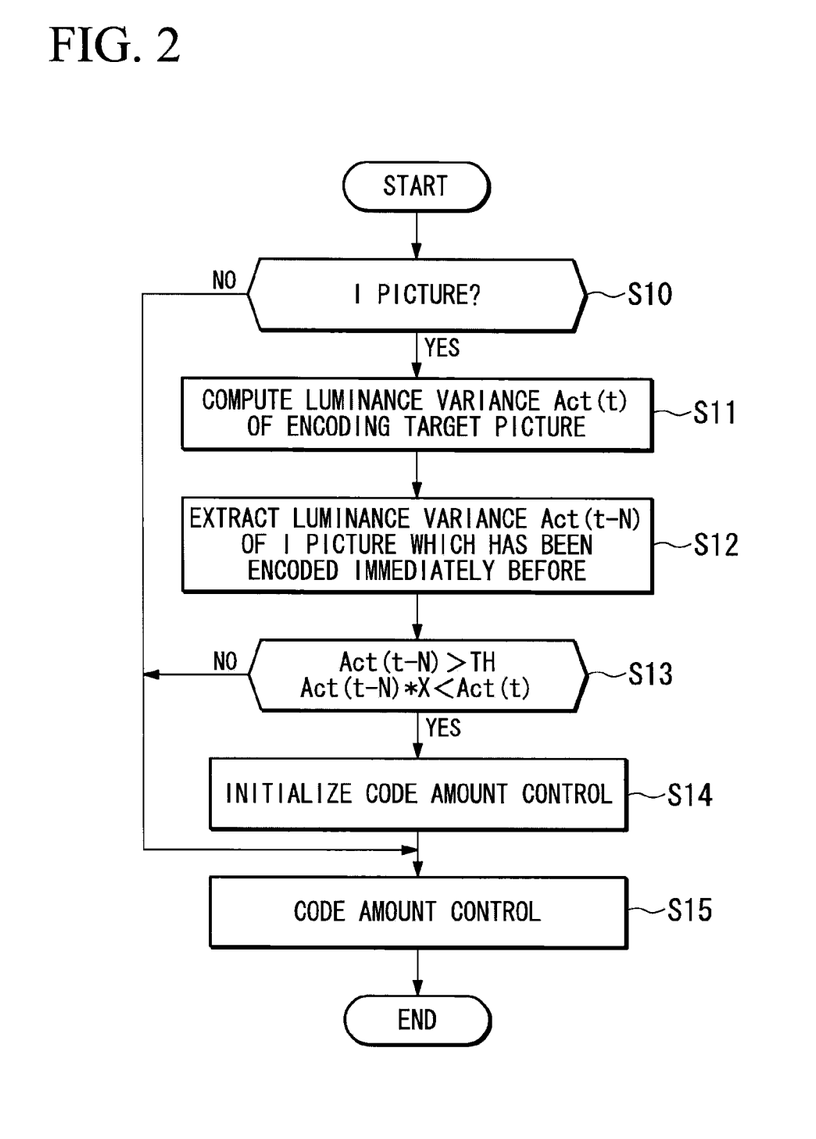
FIG. 2 is a flowchart for an embodiment of the present invention.

FIG. 2 shows a flowchart for the present embodiment.

First, it is determined whether or not the encoding target picture is an I picture (see step S10).

If it is a picture of another type, the code amount control is performed with no change (see step S15).

If it is an I picture, luminance variance Act(t) of the encoding target picture is computed (see step S11).

Next, luminance variance Act(t−N) of the relevant I picture (which has been encoded immediately before) is extracted from a memory which stores feature values of previously-encoded pictures (see step S12).

The two luminance variances Act(t) and Act(t−N) are compared with each other (see step S13).

Here, it is determined whether the luminance variance Act(t−N) of the previously-encoded picture is larger than the threshold TH and a value X times as much as Act(t−N) is smaller than the luminance variance Act(t) of the encoding target picture.

If the two conditional formulas are satisfied, the amount of code generated for the encoding target I picture is estimated based on the luminance variance, and parameters for the code amount control are initialized (see step S14). After that, the code amount control is executed (see step S15).

In the other cases, the code amount control is performed with no change (see step S15).

In the present embodiment, the luminance variance computation is applied to only I pictures. However, if the luminance variance is used for quantization control or the like, the luminance variance computation may be applied to all picture types.

In addition, if there is a feature value (e.g., a luminance variance or a color difference variance) which has been computed for another aim and indicates a complexity in video, it can also be used in the present operation.

Figure 3:
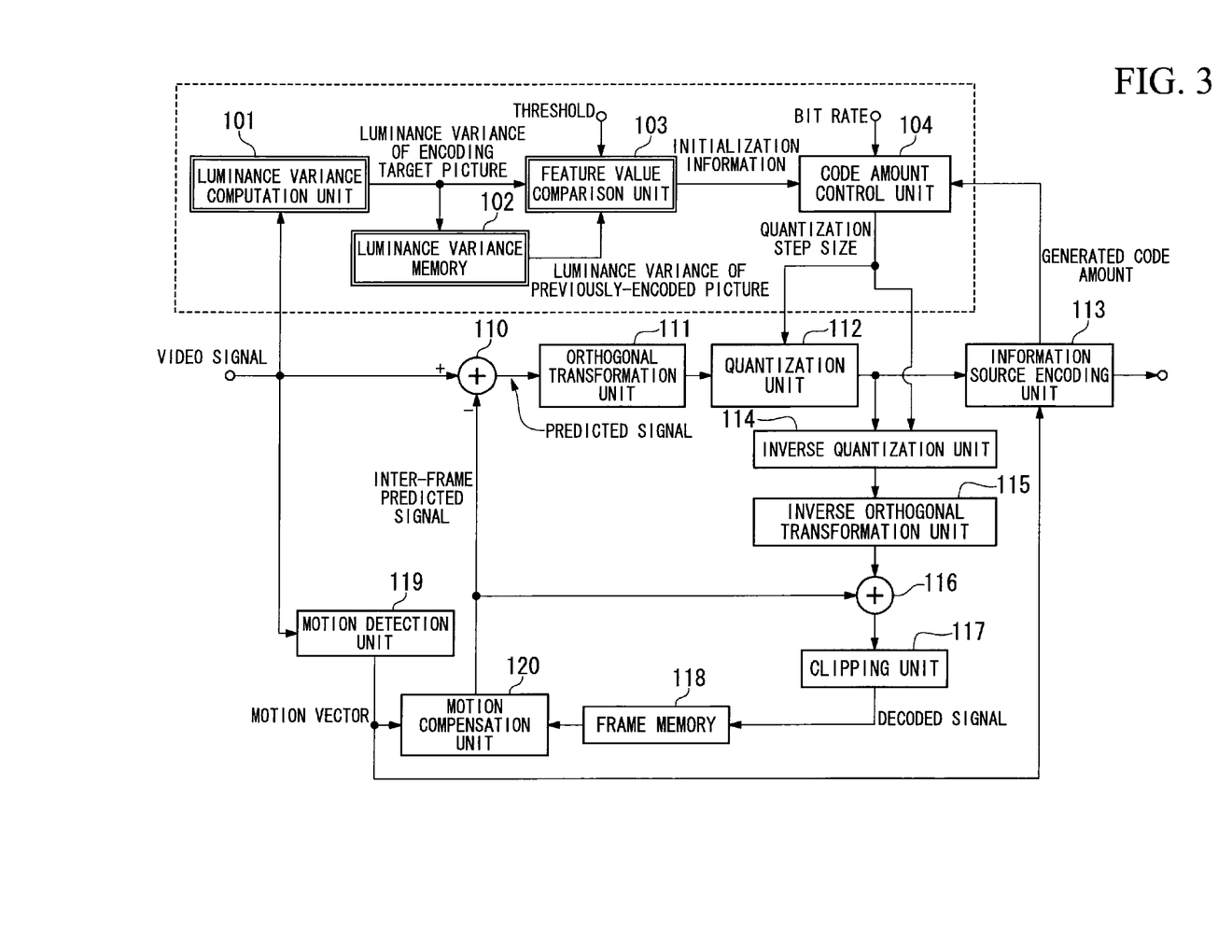
FIG. 3 is a diagram showing an example of the structure of an apparatus according to the embodiment of the present invention.

FIG. 3 shows an example of the structure of an apparatus according to the present embodiment.

In FIG. 3, a luminance variance computation unit 101, a luminance variance memory 102, a feature value comparison unit 103, and a code amount control unit 104 are distinctive parts of the present embodiment in comparison with a video encoding apparatus which performs a generally known code amount control.

The luminance variance computation unit 101 computes a luminance variance for an input video image. Each computed result is stored in the luminance variance memory 102, and simultaneously sent to the feature value comparison unit 103.

The feature value comparison unit 103 receives a luminance variance of an encoding target picture and extracts a luminance variance of a previously-encoded picture, which is stored in the luminance variance memory 102. The feature value comparison unit 103 compares both luminance variances with each other.

According to the comparison, if it is determined that characteristics of both pictures are considerably different from each other, the feature value comparison unit 103 outputs initialization information, thereby initializing the code amount control unit 104.

The code amount control unit 104 determines a quantization step size based on the relevant bit rate and amount of generated code, so as to perform the code amount control. If receiving the initialization information, the code amount control unit 104 performs the code amount control after initializing the inner state of the unit.

In FIG. 3, parts outside an area surrounded by a dotted line are almost similar to those included in any apparatus which performs video encoding based on a conventional standard such as MPEG-2, H.264, or the like.

A predicted residual signal generation unit 110 generates a predicted residual signal in accordance with a difference between the input video signal and an inter-frame predicted signal. This predicted residual signal is input into an orthogonal transformation unit 111, which outputs transform coefficients obtained by an orthogonal transformation such as a DCT transform. The transform coefficients are input into a quantization unit 112, which quantizes the transform coefficients in accordance with the quantization step size determined by the code amount control unit 104. The quantized transform coefficients are input into an information source encoding unit 113 in which the quantized transform coefficients are subjected to entropy encoding.

The quantized transform coefficients are also subjected to inverse quantization in an inverse quantization unit 114, and then to an inverse orthogonal transformation in an inverse orthogonal transformation unit 115, thereby generating a decoded predicted residual signal. This decoded predicted residual signal is added to the inter-frame predicted signal by an adder 116, thereby generating a decoded signal. The decoded signal is subjected to clipping in a clipping unit 117, and then is stored in a frame memory 118 so as to be used as a reference image in predictive encoding of the next frame.

A motion detection unit 119 performs motion detection for the input video signal by means of motion search, and outputs an obtained motion vector to a motion compensation unit 120 and the information source encoding unit 113. In the information source encoding unit 113, the motion vector is subjected to entropy encoding. In the motion compensation unit 120, the frame memory 118 is referred to according to the motion vector, thereby generating an inter-frame predicted signal.

The above-described code amount control operation may be implemented using a computer and a software program, and the software program may be stored in a computer-readable storage medium or provided via a network.

INDUSTRIAL APPLICABILITY

In accordance with the present invention, it is possible to control the amount of code of an encoding target picture by using no encoding result of a previously-encoded picture whose characteristics considerably differ from those of the encoding target picture. Therefore, even when video characteristics of both pictures are considerably different from each other, an appropriate code amount allocation can be performed, thereby preventing degradation in image quality due to the code amount control.

Reference Symbols
101 luminance variance computation unit
102 luminance variance memory
103 feature value comparison unit
104 code amount control unit

The invention claimed is:

1. A code amount control method used in a video encoding method for performing code amount control by estimating an amount of code generated for an encoding target picture, the control method comprising:
   a step that computes a feature value of the encoding target picture and stores the feature value of the encoding target picture into a storage device;
   a step that extracts a feature value of a previously-encoded picture which is used for generated code amount estimation, where the feature value of the previously-encoded picture has been stored in the storage device;
   a step that compares the feature value of the encoding target picture with the feature value of the previously-encoded picture, where the encoding target picture and the previously-encoded picture are both intra pictures and they are positioned at a large interval such that there are at least five pictures between them; and
   a step that is performed according to a result of the feature value comparison, wherein if it is determined that difference between both feature values is larger than a predetermined criterion value and the encoding target picture is more complex than the previously-encoded picture, the step estimates the amount of code generated for the encoding target picture without using any result of encoding of previously-encoded pictures, and otherwise the step estimates the amount of code generated for the encoding target picture based on a result of encoding of the previously-encoded picture;
   wherein if it is determined that the difference between both feature values is larger than a predetermined criterion value and the encoding target picture is more complex than the previously-encoded picture the code amount control for non-intra pictures are performed in an initialized state, without using any encoding result of previously-encoded pictures.

2. The code amount control method in accordance with claim 1, wherein:
   one of a variance, an average, and a coefficient obtained by Fourier transform of a luminance signal or a color difference signal is used as each feature value.

3. The code amount control method in accordance with claim 1, wherein:
   in the step that estimates the amount of code generated for the encoding target picture, when determining whether or not the difference between both feature values is larger than the predetermined criterion value, a threshold is applied to a ratio between both feature values.

4. The code amount control method in accordance with claim 3, wherein:
   in the step that estimates the amount of code generated for the encoding target picture, another threshold is also applied to a size of the feature values.

5. The code amount control method in accordance with claim 1, wherein:
   when estimating the amount of code generated for the encoding target picture without using any result of encoding of previously-encoded pictures, parameters for the code amount control are initialized in advance.

6. The code amount control method in accordance with claim 1, wherein:
   when estimating the amount of code generated for the encoding target picture without using any result of encoding of previously-encoded pictures, the amount of code generated is estimated using the feature value of the encoding target picture.

7. A non-transitory computer-readable storage medium which stores a code amount control program by which a computer executes the video code amount control method used in the video encoding method in accordance with claim 1.

8. The code amount control method in accordance with claim 1, wherein:
an encoding target picture and a previously-encoded picture, which are not intra pictures but have the same picture type, are also processed by the steps of the control method.

9. A code amount control apparatus used for a video encoding method for performing code amount control by estimating an amount of code generated for an encoding target picture, the control apparatus comprising:
a device that computes a feature value of the encoding target picture;
a storage device that stores the computed feature value of the encoding target picture;
a device that extracts a feature value of a previously-encoded picture which is used for generated code amount estimation, where the feature value of the previously-encoded picture has been stored in the storage device;
a device that compares the feature value of the encoding target picture with the feature value of the previously-encoded picture, where the encoding target picture and the previously-encoded picture are both intra pictures and they are positioned at a large interval such that there are at least five pictures between them; and
a device that is performed according to a result of the feature value comparison, wherein if it is determined that difference between both feature values is larger than a predetermined criterion value and the encoding target picture is more complex than the previously-encoded picture, the device estimates the amount of code generated for the encoding target picture without using any result of encoding of previously-encoded pictures, and otherwise the device estimates the amount of code generated for the encoding target picture based on a result of encoding of the previously-encoded picture;
wherein if it is determined that the difference between both feature values is larger than a predetermined criterion value and the encoding target picture is more complex than the previously-encoded picture the code amount control for non-intra pictures are performed in an initialized state, without using any encoding result of previously-encoded pictures.

10. The code amount control apparatus in accordance with claim 9, wherein:
an encoding target picture and a previously-encoded picture, which are not intra pictures but have the same picture type, are also processed by the devices of the control apparatus.

\* \* \* \* \*